United States Patent
Hirose

(10) Patent No.: US 10,394,225 B2
(45) Date of Patent: Aug. 27, 2019

(54) SYNCHRONIZATION CONTROLLER HAVING FUNCTION OF SOLVING SHOCK GENERATED IN SYNCHRONIZATION START BLOCK

(71) Applicant: FANUC CORPORATION, Minamitsuru-gun, Yamanashi (JP)

(72) Inventor: Noboru Hirose, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 454 days.

(21) Appl. No.: 15/226,293

(22) Filed: Aug. 2, 2016

(65) Prior Publication Data

US 2017/0038746 A1 Feb. 9, 2017
US 2017/0364041 A9 Dec. 21, 2017

(30) Foreign Application Priority Data

Aug. 3, 2015 (JP) .................. 2015-153506

(51) Int. Cl.
*G05B 13/02* (2006.01)
*G05B 19/416* (2006.01)
*G05B 15/02* (2006.01)

(52) U.S. Cl.
CPC ........... *G05B 19/416* (2013.01); *G05B 15/02* (2013.01); *G05B 2219/42191* (2013.01); *G05B 2219/43048* (2013.01); *G05B 2219/50234* (2013.01)

(58) Field of Classification Search
CPC .................. G05B 15/02; G05B 19/416; G05B 2219/42191; G05B 2219/43048; G05B 2219/50234
See application file for complete search history.

(56) References Cited

U.S. PATENT DOCUMENTS

2002/0003416 A1 1/2002 Sagasaki et al.
2005/0248304 A1 11/2005 Endou et al.
(Continued)

FOREIGN PATENT DOCUMENTS

CN 1696852 A 11/2005
CN 101216705 A 7/2008
(Continued)

OTHER PUBLICATIONS

Ntoification of Reasons for Refusal for Japanese Application No. 2015-153506, dated Sep. 5, 2017 with translation 6 pages.
(Continued)

*Primary Examiner* — Kenneth M Lo
*Assistant Examiner* — Mohammad A Rahman
(74) *Attorney, Agent, or Firm* — RatnerPrestia

(57) ABSTRACT

In a synchronization operation instruction of a synchronization control of moving a slave axis at a certain ratio with respect to a master axis movement amount, a master axis movement amount before start of change of a synchronization magnification, used in an operation based on a synchronization magnification changing instruction, is determined by referring to a parameter of the synchronization operation instruction so that the operation based on the synchronization magnification changing instruction ends at a set synchronization start master axis position. With such a configuration, the synchronization control is started based on the synchronization operation instruction from the synchronization start master axis position set in the synchronization operation instruction.

2 Claims, 5 Drawing Sheets

(56) References Cited

U.S. PATENT DOCUMENTS

| | | | |
|---|---|---|---|
| 2006/0125438 A1 | 6/2006 | Fujibayashi et al. | |
| 2008/0180051 A1 | 7/2008 | Hishikawa et al. | |
| 2013/0002185 A1 | 1/2013 | Hosomi et al. | |
| 2013/0110278 A1 | 5/2013 | Okita et al. | |

FOREIGN PATENT DOCUMENTS

| | | | | |
|---|---|---|---|---|
| CN | 104238447 A | | 12/2014 | |
| JP | 2004130444 A | | 4/2004 | |
| JP | 2006-164009 | | 6/2006 | |
| JP | 2006164009 | * | 6/2006 | .............. G05D 3/00 |
| JP | 2013011937 A | | 1/2013 | |
| WO | 0039646 A1 | | 7/2000 | |

OTHER PUBLICATIONS

Chinese Office Action for Chinese Application No. 2016106295871, dated Nov. 5, 2018, with translation, 14 pages.

* cited by examiner

SYNCHRONIZATION CONTROLLER HAVING FUNCTION OF SOLVING SHOCK GENERATED IN SYNCHRONIZATION START BLOCK

BACKGROUND OF THE INVENTION

1. Field of the Invention

The present invention relates to a synchronization controller and particularly to a synchronization controller having a function of solving a shock generated in a synchronization start block during a synchronization control.

2. Description of the Related Art

In a machine in which a synchronization control is performed to drive a plurality of axes in a synchronized state, a movement amount is set to each of a master axis as a reference and a slave axis operated while being synchronized with the master axis and the slave axis is operated by using a ratio between the master axis movement amount and the slave axis movement amount as a speed ratio. In that case, if the slave axis starts to be synchronized with the master axis which is currently moving, the slave axis which has been in a stopped state so far tries to reach, with rapid acceleration, a speed obtained by multiplying the speed of the master axis by the speed ration. Thus, there is a case in which a shock is generated when the synchronization starts.

In order to prevent such a shock from being generated in the slave axis at a time when the synchronization starts, JP 2006-164009 A discloses a prior art technique to use an instruction which gradually changes a synchronization magnification between a master axis and a slave axis. Here, a shock to be generated when a driving operation starts at a speed ratio between the master axis and the slave axis is prevented in a manner such that the synchronization magnification with respect to the master axis is gradually increased from zero until the slave axis in the stop state reaches a desired synchronized speed based on instructions of a master axis position at a time when the slave axis in the stop state starts to be accelerated, a master axis movement amount and a slave axis movement amount used for the gradual acceleration to the desired synchronization speed, and a speed ratio between the master axis and the slave axis at a time when the acceleration ends.

FIG. 6 is a diagram illustrating an operation when the slave axis in the stop state is synchronized with the master axis in the technique disclosed in JP 2006-164009 A.

In this technique, regarding a synchronization magnification changing instruction, five parameters including an initial synchronization magnification αa (zero in the stop state), a final synchronization magnification αb, a master axis movement amount Dm, a slave axis movement amount Ds, and a master axis movement amount da before start of synchronization magnification change (where a remaining master axis movement amount db after the change of synchronization magnification is zero) are set. Further, regarding a synchronization operation instruction, two parameters including a master axis movement amount Dm2 and a slave axis movement amount Ds2 are set.

By the setting of the parameters in the above-described two instructions (the synchronization magnification changing instruction and the synchronization operation instruction), a synchronization control is performed in which an operation based on the synchronization magnification changing instruction first starts after the master axis moves by a distance da and the synchronization magnification gradually increases from zero to αb when the slave axis moves completely by the slave axis movement amount Ds. Subsequently, an operation based on the synchronization operation instruction starts so that the slave axis moves by a distance Ds2 at a constant synchronization magnification αb.

By such a synchronization control, the slave axis is gradually accelerated by the operation based on the synchronization magnification changing instruction and attains a synchronization speed at the start time of synchronization operation instruction when the operation based on the synchronization magnification changing instruction ends, and hence the synchronization of the slave axis can be started by a smooth acceleration operation.

However, in an instruction of changing the synchronization magnification for gradually increasing the synchronization magnification with respect to the master axis from zero, if the slave axis movement amount is erroneously set to a large value with respect to instruction values of the master axis position at which the slave axis in the stop state starts to be accelerated and the master axis movement amount required for gradual acceleration to the desired synchronization speed, an acceleration becomes larger than a desired acceleration, thereby arising a problem in that a mechanical shock is generated when the synchronization is started.

More specifically, when the slave axis movement amount Ds is erroneously set in the synchronization magnification changing instruction, for example, when the slave axis movement amount is set to be slightly large, a problem arises in that the acceleration of the operation based on the synchronization magnification changing instruction increases as shown in FIG. 7A. Further, when the slave axis movement amount is erroneously set to be larger, a problem arises in that the speed of the operation based on the synchronization magnification changing instruction is excessively accelerated or decelerated as shown in FIG. 7B.

Further, since the master axis position at which the slave axis in the stop state starts to be accelerated is set by the synchronization magnification changing instruction of gradually increasing the synchronization magnification with respect to the master axis from zero, it is not possible to set the master axis position, in other words, the original synchronization start position at a time point in which the set synchronization magnification is attained.

That is, as described above by referring to FIG. 6, in the synchronization magnification changing instruction, the master axis movement amount da before start of synchronization magnification change is set to set the movement start position of the operation based on the synchronization magnification changing instruction. In the subsequent synchronization operation instruction, the operation based on the synchronization operation instruction needs to be started immediately after the operation based on the synchronization magnification changing instruction is completed. For that reason, synchronization operation instruction for starting the synchronization does not allow the position of the master axis (a position indicated by "Sp" of FIG. 6) to be set directly.

SUMMARY OF THE INVENTION

Here, an object of the invention is to provide a synchronization controller having a function of solving a shock generated in a synchronization start block during a synchronization control.

A synchronization controller according to the invention is configured to start to move a slave axis when a master axis passes a certain position and then move by a predetermined distance while the master axis moves from the position by a predetermined distance. The synchronization controller includes: a synchronization operation instruction unit configured to set a position of the master axis at which the slave axis starts to be synchronized, a master axis movement amount, and a slave axis movement amount; a synchronization magnification changing instruction unit configured to set the slave axis movement amount immediately before the synchronization; a synchronization parameter calculation unit configured to calculate a synchronization magnification at a time when changing of the synchronization magnification is completed, a master axis movement amount at a time when the synchronization magnification is changed, and a master axis movement amount before start of changing of the synchronization magnification, based on the slave axis movement amount, the master axis movement amount, and the master axis position at which the slave axis starts to be synchronized, which are set by the synchronization operation instruction unit, as well as the slave axis movement amount set by the synchronization magnification changing instruction unit; a position calculation unit configured to calculate an inclination of the synchronization magnification and a position of the master axis at which the slave axis in a stop state starts to be operated, based on a calculation result of the synchronization parameter calculation unit to attain the synchronization magnification at a time when changing of the synchronization magnification is completed, calculated by the synchronization parameter calculation unit, at a time point when the slave axis completes moving by the movement amount set by the synchronization magnification changing instruction unit; and a slave axis movement amount output unit configured to output an instruction to the slave axis from a position of the master axis at which a synchronization magnification changing operation is started.

Then, in a first aspect of the synchronization controller according to the invention, the position calculation unit is configured to calculates an inclination of the synchronization magnification as well as a position of the master axis at which the slave axis in a stop state starts to be operated, and the slave axis movement amount output unit is configured to output an instruction to the slave axis by gradually changing, from a position of the master axis at which a synchronization magnification changing operation is started, the inclination of the synchronization magnification with respect to a master axis speed.

In a second aspect of the synchronization controller according to the invention, the position calculation unit is configured to calculate a position of the master axis at which the slave axis in a stop state starts to be operated in response to a set synchronization magnification change pattern, and the slave axis movement amount output unit is configured to output, from a position of the master axis at which a synchronization magnification changing operation is started, an instruction to the slave axis while changing the synchronization magnification in response to a position of the master axis in accordance with the set synchronization magnification change pattern.

According to the invention, a smooth acceleration operation is performed in the operation based on the synchronization magnification changing instruction of gradually increasing the synchronization magnification with respect to the master axis from zero since the master axis position at which the slave axis in the stop state starts to be accelerated is adjusted in response to the set slave axis movement amount and hence a mechanical shock generated when the synchronization starts is reduced.

Further, since an original synchronization start position achieving the synchronization magnification set in the synchronization operation instruction can be set directly and the data set in the synchronization magnification changing instruction is decreased from a plurality of pieces of data to only one slave axis movement amount, it is possible to reduce a possibility in which a parameter is erroneously set by an operator.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

In the invention, a synchronization controller of moving a slave axis at a certain ratio with respect to a master axis movement amount inputs an instruction of gradually accelerating the slave axis before a synchronization operation instruction so that a mechanical shock is not generated when the slave axis reaches a certain speed ratio on the condition that the slave axis is operated at the certain speed ratio when the master axis passes through a predetermined position. In this instruction, since the master axis position at which the slave axis in a stop state starts to be accelerated is adjusted in response to a set slave axis movement amount, a mechanical shock generated when the synchronization starts is reduced.

More specifically, in the invention, the parameters set in the synchronization magnification changing instruction of gradually increasing the synchronization magnification with respect to the master axis from zero are set only to the slave axis movement amount and the other necessary information is set in the synchronization operation instruction performed right after the synchronization magnification changing instruction. The parameters set in the synchronization operation instruction include a position of the master axis at which the slave axis starts to be synchronized with the master axis and a master axis movement amount and a slave axis movement amount used for the synchronization operation. Then, the master axis position at which the slave axis in the stop state starts to be accelerated and the master axis movement amount used for the gradual acceleration to a desired synchronization speed are calculated from these parameters so that a speed ratio at an end point of an operation based on the synchronization magnification changing instruction of gradually increasing the synchronization magnification with respect to the master axis from zero becomes equal to a speed ratio at a time when an operation based on the subsequent synchronization operation instruction starts, and then the operation based on the synchronization magnification changing instruction is controlled in accordance with the calculation values.

Figure 1:
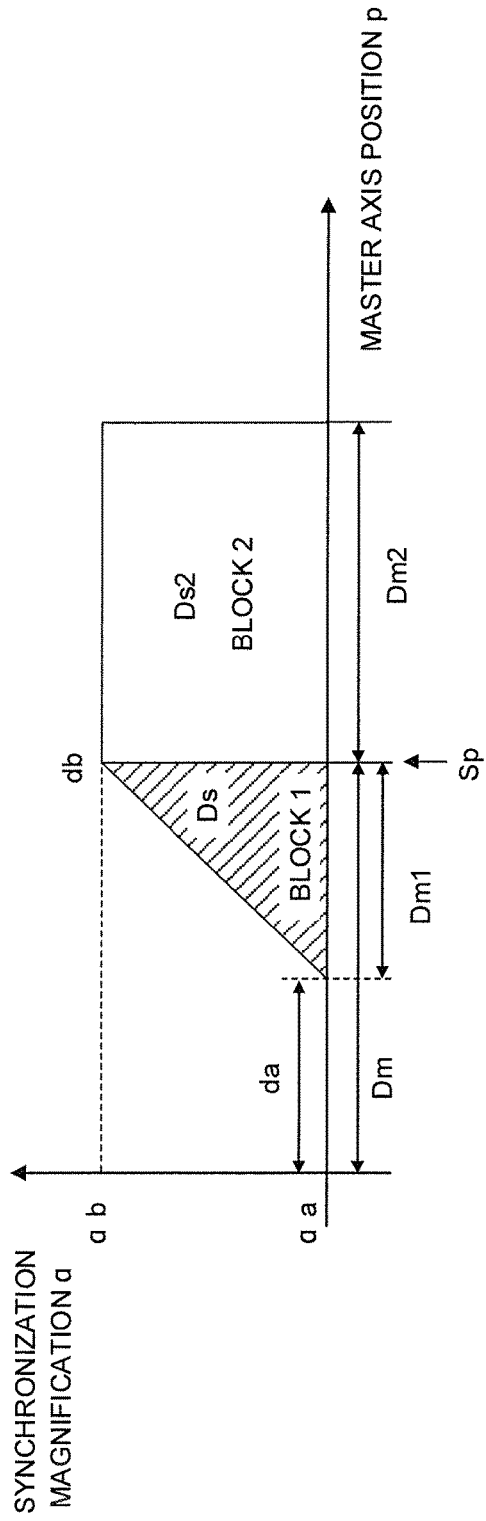
FIG. 1 is a diagram illustrating a principle of operation of a synchronization controller according to the invention.
Figure 2:
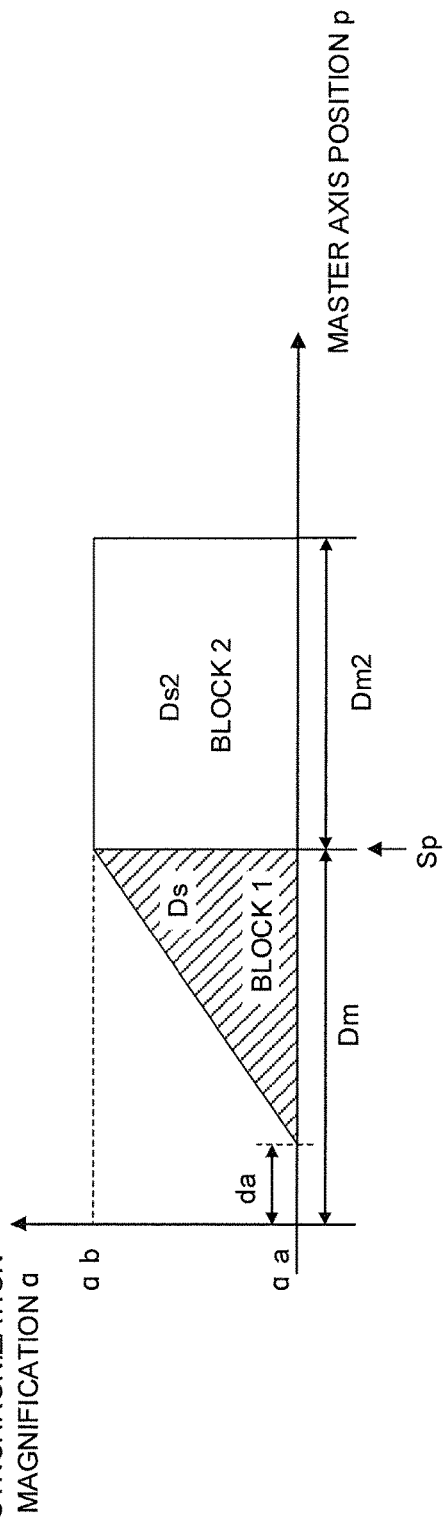
FIG. 2 is a diagram illustrating a synchronization magnification changing operation using the synchronization controller according to the invention.
Figure 3:
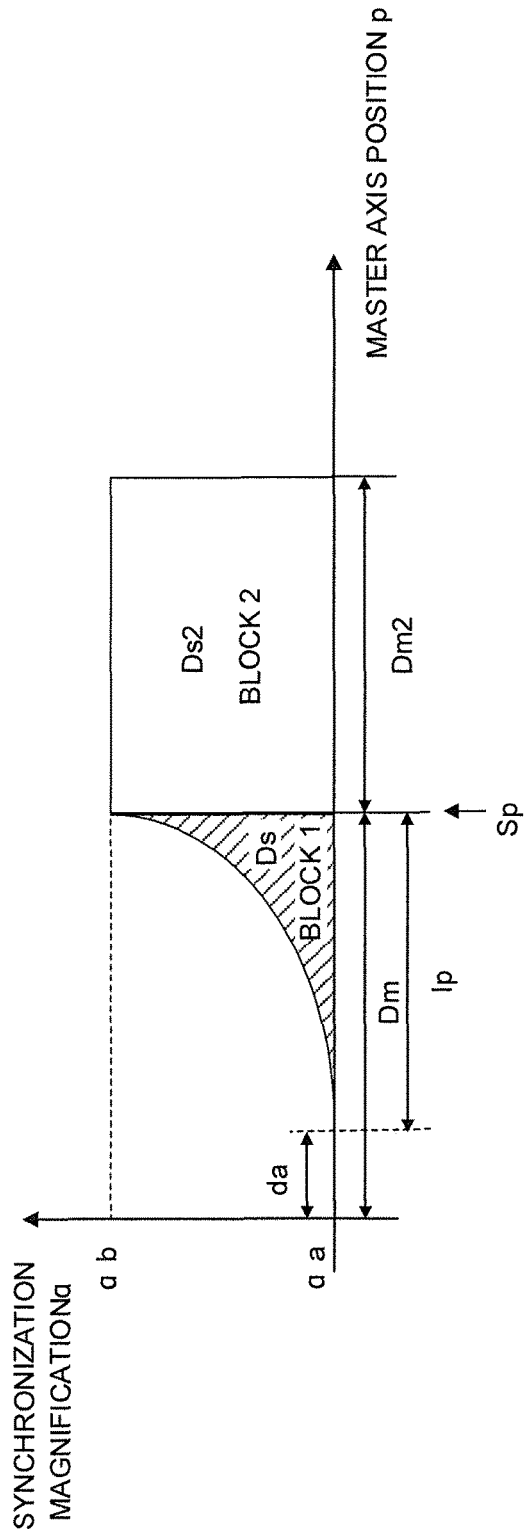
FIG. 3 is a diagram illustrating a synchronization magnification changing operation using the synchronization controller according to the invention based on a quadratic function.
Figure 6:
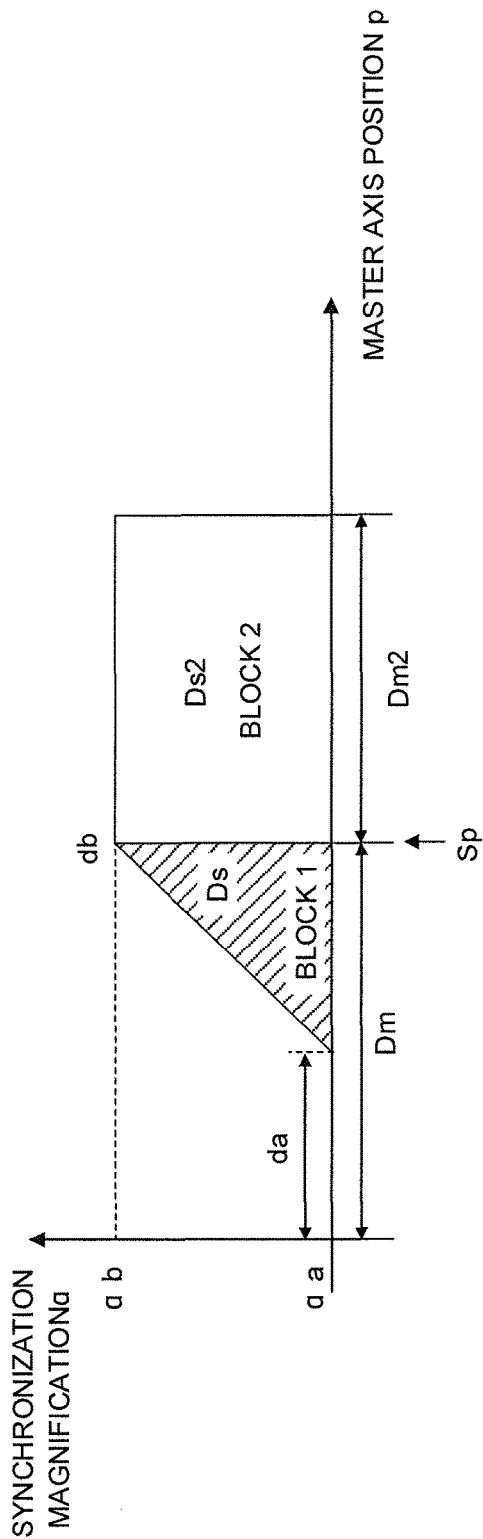
FIG. 6 is a diagram illustrating an operation of a synchronization controller of the related art.

FIGS. 1 to 3 are diagrams illustrating a principle of operation of a synchronization controller according to the invention.

In the invention, only a slave axis movement amount Ds among the parameters set in the instructions disclosed in JP 2006-164009 A is set as the parameter in the synchronization magnification changing instruction. Further, an initial synchronization magnification αa (=0), a final synchronization magnification αb, a master axis movement amount Dm, and a master axis movement amount da before start of synchronization magnification change are calculated based on a synchronization start master axis position Sp, a master axis movement amount Dm2, and a slave axis movement amount Ds2 as the parameters set in the synchronization operation instruction.

In the invention, in the synchronization magnification changing instruction, the master axis movement amount da before start of synchronization magnification change is not set and only the slave axis movement amount Ds is set. Then, the master axis movement amount da before start of synchronization magnification change, used in the operation based on the synchronization magnification changing instruction, is determined by referring to the parameter of the synchronization operation instruction so that the operation based on the synchronization magnification changing instruction ends at the synchronization start master axis position Sp set in the synchronization operation instruction. In this way, a synchronization control based on the synchronization operation instruction starts from the synchronization start master axis position Sp set in the synchronization operation instruction.

Hereinafter, a method of calculating the final synchronization magnification αb, the master axis movement amount Dm, and the master axis movement amount da before start of synchronization magnification change based on the parameters set in the synchronization magnification changing instruction and the synchronization operation instruction will be described with reference to FIG. 1.

Since the final synchronization magnification αb of the operation control based on the synchronization magnification changing instruction is a ratio between the master axis movement amount Dm2 and the slave axis movement amount Ds2 in the synchronization control based on the synchronization operation instruction, the final synchronization magnification is calculated by the following Equation (1).

$$\alpha b = \frac{Ds2}{Dm2} \tag{1}$$

Further, the master axis movement amount Dm1 necessary for the slave axis in the stop state to attain the speed ratio (the synchronization magnification) αb with respect to the master axis in the operation control based on the synchronization magnification changing instruction is calculated by the following Equation (1).

$$Dm1 = \frac{2Ds}{\alpha b} \tag{2}$$

Further, the master axis movement amount da before start of synchronization magnification change is expressed by the following Equation (3) by using the master axis movement amount Dm as the movement amount from the current master axis position to the synchronization start master axis position Sp of the synchronization operation instruction.

$$da = Dm - Dm1 \tag{3}$$

Then, the master axis movement amount da before start of synchronization magnification change is calculated based on the following Equation (4) by applying the above-described Equations (1) and (2) to the above-described Equation (3).

$$da = Dm - 2Ds \times \frac{Dm2}{Ds2} \tag{4}$$

By using the calculation values calculated in this way, the synchronization controller of the invention starts the operation control based on the synchronization magnification changing instruction at a time point in which the master axis moves by a distance da from the current position and controls the slave axis so that the synchronization magnification gradually increases from zero and gets to the synchronization magnification αb when the slave axis moves completely by the slave axis movement amount Ds.

Subsequently, the synchronization controller starts the synchronization control based on the synchronization operation instruction and controls the slave axis so that the slave axis moves by a distance Ds2 at a constant synchronization magnification αb.

Accordingly, the slave axis is gradually accelerated by the operation control based on the synchronization magnification changing instruction to attain the synchronization speed at a start time of synchronization control based on the synchronization operation instruction, at a time point in which the operation control based on the synchronization magnification changing instruction ends. Accordingly, the synchronization of the slave axis can be started by a smooth acceleration operation.

By adopting the above-described parameter setting, the synchronization start master axis position Sp in the synchronization operation instruction originally starting the synchronization can be set directly as the parameter.

Further, even when the slave axis movement amount Ds is erroneously set to a large value by the synchronization magnification changing instruction, a smooth acceleration is set due to the adjustment of decreasing the master axis movement amount da before start of synchronization magnification change as shown in FIG. 2 and hence a mechanical shock generated by an operator's erroneous setting can be prevented to a certain degree.

In the invention, the acceleration operation control based on the synchronization magnification changing instruction can be performed more smoothly by further changing the acceleration synchronization magnification change pattern using an nth-order function.

For example, the synchronization magnification change pattern in the acceleration state is defined by a quadratic function, the operation control based on the synchronization magnification changing instruction starts at a time point in which the master axis moves by a distance da, and the slave axis movement amount with respect to the master axis position, calculated from the quadratic function defined with the synchronization magnification being zero at an initial stage, is calculated. Then, the speed of the slave axis is gradually increased at the obtained synchronization magnification and the synchronization magnification αb is attained when the slave axis moves completely by the slave axis movement amount Ds. In this way, the operation control may be performed.

Then, the synchronization control based on the subsequent synchronization operation instruction is started and the slave axis moves by a distance Ds2 at a constant synchronization magnification αb.

A method of calculating the final synchronization magnification αb, the master axis movement amount Dm, and the master axis movement amount da before start of synchronization magnification change based on the parameters set in the synchronization magnification changing instruction and the synchronization operation instruction by the synchronization magnification changing control using the above-described quadratic function will be described with reference to FIG. 3.

Since the final synchronization magnification αb of the operation control based on the synchronization magnification changing instruction is a ratio between the master axis movement amount Dm2 and the slave axis movement amount Ds2 of the synchronization control based on the synchronization operation instruction, the final synchronization magnification is calculated by the above-described Equation (1).

Further, if a relation between the synchronization magnification α and the master axis movement amount p with respect to the slave axis movement amount in the operation control based on the synchronization magnification changing instruction is expressed by a quadratic function of α=f(p) and the master axis movement amount necessary for the synchronization magnification to change from zero to αb is indicated by lp, then the value obtained by integrating f(p) from the master axis movement amount zero to lp is equal to the slave axis movement amount Ds set in the synchronization magnification changing instruction. Accordingly, the following Equation (5) is established.

$$\int_0^{lp} f(p)dp = Ds \quad (5)$$

Further, the master axis movement amount Dm becomes the movement amount from the current master axis position to the synchronization start master axis position Sp in the synchronization operation instruction and the master axis movement amount da before start of synchronization magnification change can be expressed by the following Equation (6).

$$da = Dm - lp \quad (6)$$

Thus, the master axis movement amount lp necessary for the synchronization magnification to change from zero to αb and the master axis movement amount da before start of synchronization magnification change can be obtained by the above-described Equations (5) and (6).

Further, a relation between the master axis position or the movement amount and the synchronization magnification can be registered in advance as table information instead of the above-described nth-order function and the synchronization magnification can be changed in accordance with the table information. Thus, a smooth acceleration operation can be performed in the same way.

The description above corresponds to a description of a principle of operation of each of embodiments of the invention. Hereinafter, an embodiment of the invention will be described.

Figure 4:
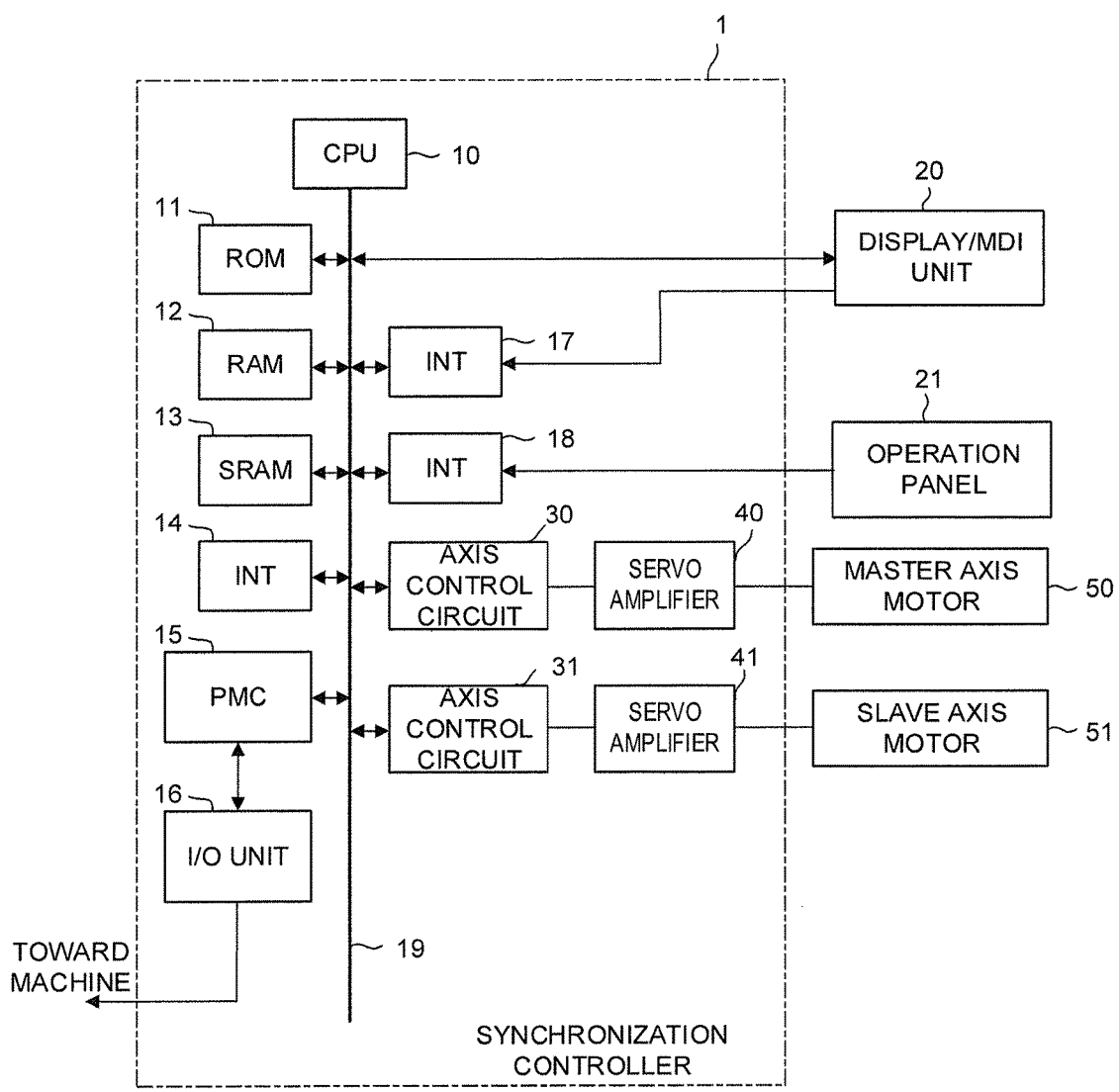
FIG. 4 is a schematic block diagram of a synchronization controller according to an embodiment of the invention.

FIG. 4 is a block diagram of an embodiment of the synchronization controller that performs the above-described synchronization control.

In this embodiment, a numerical controller is used as the synchronization controller. A CPU 10 of a synchronization controller 1 is a processor that controls the entire synchronization controller 1. The CPU 10 reads a system program stored in a ROM 11 via a bus 19 and controls the entire synchronization controller according to the read system program. A RAM 12 stores temporary calculation data or display data and various data input by an operator via a display/MDI unit 20. A non-volatile memory 13 configured as a SRAM or the like corresponds to a non-volatile memory which is backed up by a battery (not shown) and keeps a storage state even when the synchronization controller 1 is turned off. The non-volatile memory 13 stores an operation program read via the interface 14 or an operation program input via the display/MDI unit 20.

The interface 14 is configured to connect the synchronization controller 1 to an external device such as an adapter. An operation program or the like is read from the external device. A programmable machine controller (PMC) 15 outputs a signal to an auxiliary equipment of a machine via an I/O unit 16 by a sequence program stored in the synchronization controller 1 to control the auxiliary equipment of a machine.

The display/MDI unit 20 is a manual data input device that includes a display or a keyboard and an interface 17 receives an instruction or data from the keyboard of the display/MDI unit 20 and transmits the result to the CPU 10.

Axis control circuits 30 and 31 for respective axes receive movement instruction amounts of respective axes from the CPU 10 and output instructions for respective axes to servo amplifiers 40 and 41. The servo amplifiers 40 and 41 receive these instructions and drive a servo motor 50 of a master axis and a servo motor 51 of a slave axis. The servo motors 50 and 51 for the respective axes respectively include position/speed detectors and feed-back position/speed feedback signals from the position/speed detectors to the axis control circuits 30 and 31 to perform a position/speed feedback control. Note that the position/speed feedback is omitted in FIG. 4.

The synchronization controller 1 shown in FIG. 4 includes the servo amplifiers 40 and 41 and the axis control circuits 30 and 31 which control the servo motors 50 and 51 for the master axis and the slave axis by performing a synchronization control on two axes, that is, the master axis and the slave axis. When the other axes are also controlled, the axis control circuits, the servo amplifiers, or the servo motors corresponding thereto are connected to the bus 19.

Figure 5:
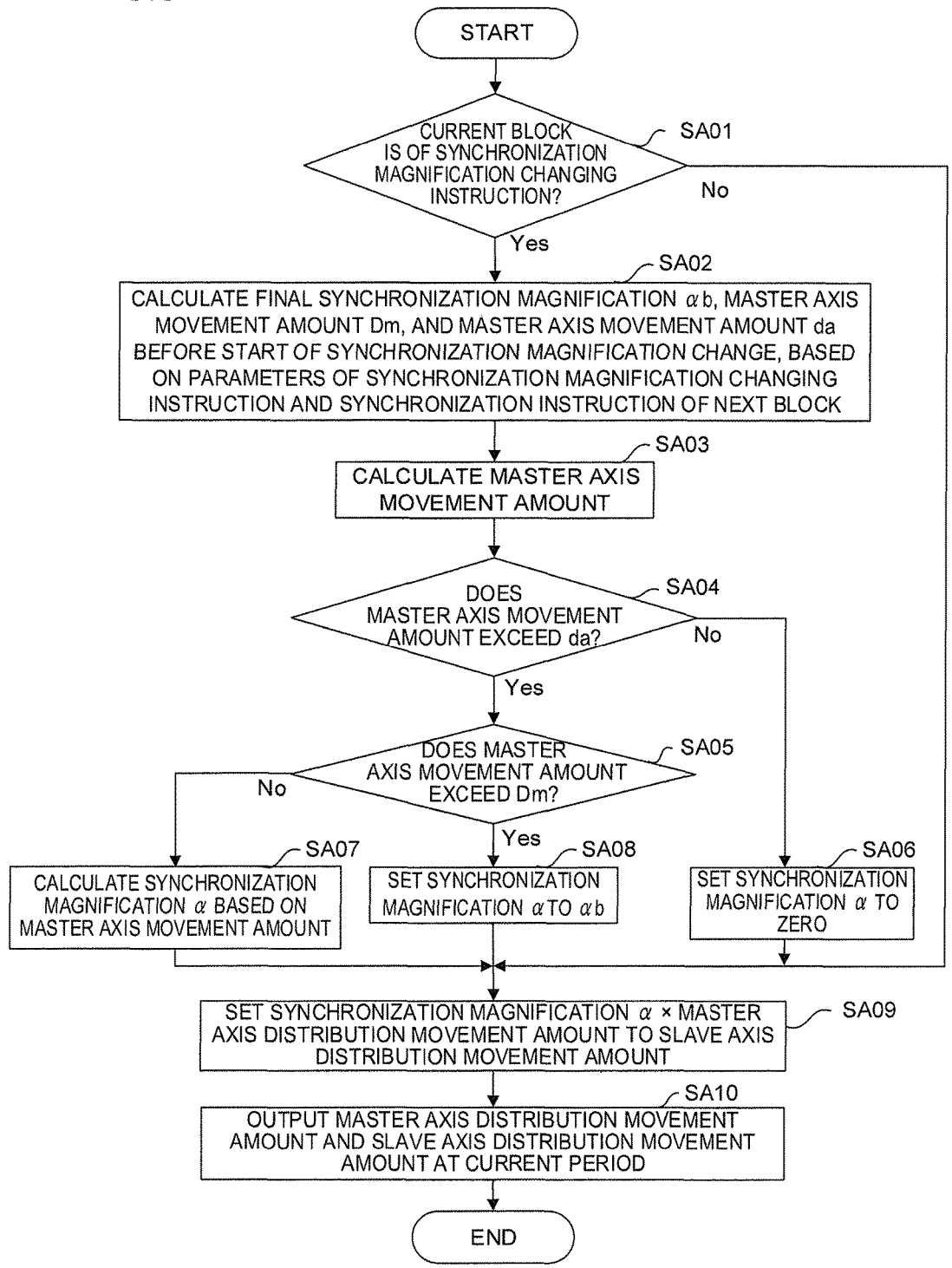
FIG. 5 is a flowchart illustrating a flow of an operation of the synchronization controller of FIG. 4.
Figure 7A:
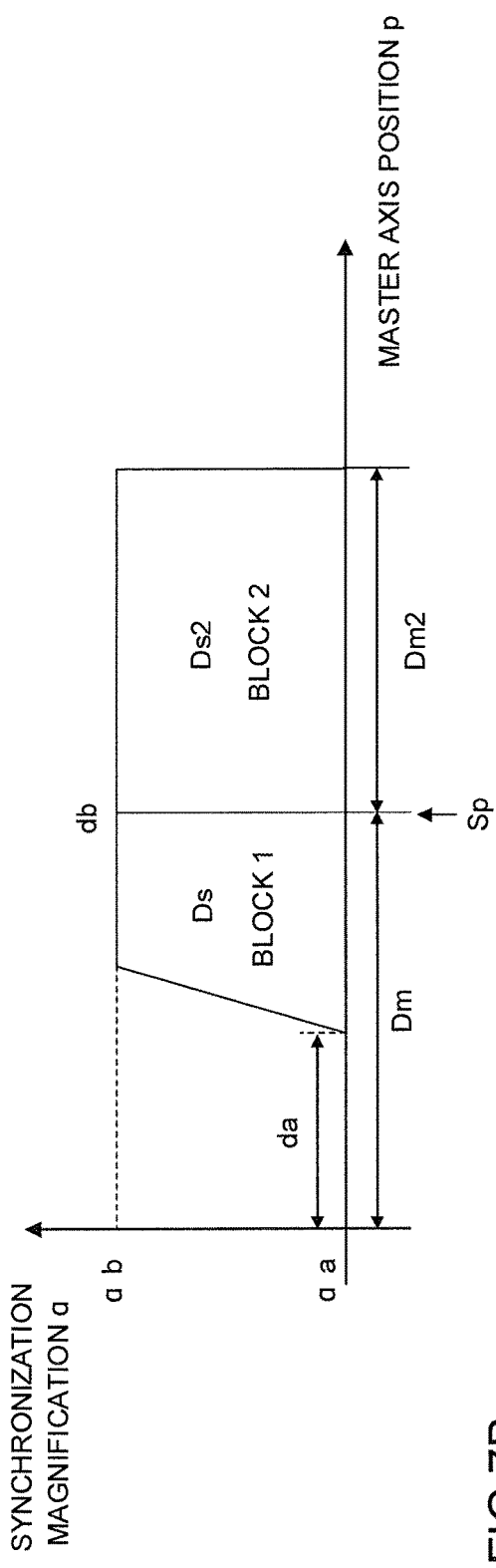
FIGS. 7A and 7B are diagrams illustrating an operation of a conventional synchronization controller based on an erroneous setting value.
Figure 7B:
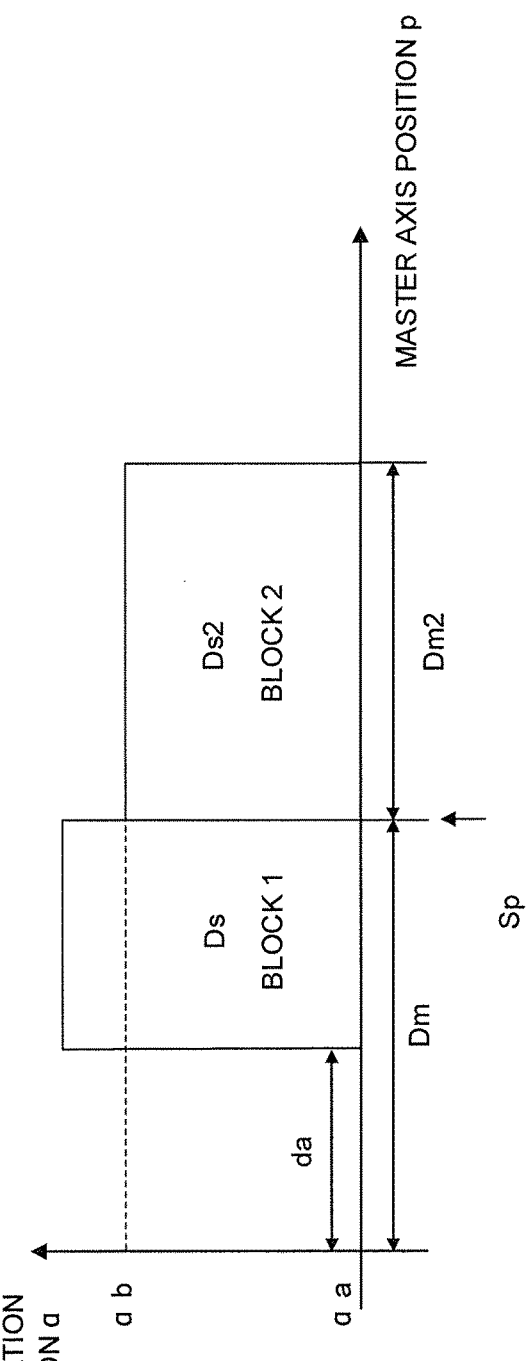

FIG. 5 is a flowchart of a process mainly focusing on a synchronization magnification changing process in a movement instruction distribution process performed every predetermined period by the operation program of the CPU 10 in an embodiment of the invention. Hereinafter, the processing is explained below according to respective steps

[step SA01] Currently, it is determined whether a process according to a synchronization magnification changing instruction is performed or not. When the process according to the synchronization magnification changing instruction is performed, the routine proceeds to step SA02. Meanwhile, when the process is not performed, the routine proceeds to step SA09 without the synchronization magnification α maintained as it is.

[step SA02] The final synchronization magnification αb, the master axis movement amount Dm, and the master axis movement amount da before start of synchronization magnification change are calculated by applying the parameters set in the synchronization magnification changing instruction and the synchronization operation instruction of the next block to the above-described relational expressions.

[step SA03] A master axis movement amount after start of a process according to the synchronization magnification changing instruction is calculated. The master axis movement amount is calculated by integrating the master axis distribution movement amount for each period after start of the process according to the synchronization magnification changing instruction.

[step SA04] It is determined whether or not the master axis movement amount after start of the process according to the synchronization magnification changing instruction exceeds the master axis movement amount da before start of synchronization magnification change. If the master axis movement amount exceeds the master axis movement amount da, the routine proceeds to step SA05, otherwise, the routine proceeds to step SA06.

[step SA05] It is determined whether or not the master axis movement amount after start of the process according to the synchronization magnification changing instruction exceeds the master axis movement amount Dm. If the master axis movement amount exceeds the master axis movement amount Dm, the routine proceeds to step SA08, otherwise the routine proceeds to step SA07.

[step SA06] The synchronization magnification α between the master axis and the slave axis is set to zero and the routine proceeds to step SA09.

[step SA07] The synchronization magnification α between the master axis and the slave axis is calculated by using the master axis movement amount after start of the process according to the synchronization magnification changing instruction and the routine proceeds to step SA09. For example, when the synchronization magnification α is increased by a primary function, the current synchronization magnification α may be obtained based on the values of αb and the ratio of the master axis movement amount after start of the process according to the synchronization magnification changing instruction with respect to the master axis movement amount Dm1.

[step SA08] The synchronization magnification α between the master axis and the slave axis is set to αb and the routine proceeds to step SA09.

[step SA09] The slave axis distribution movement amount is calculated based on the synchronization magnification α and the master axis distribution movement amount at the current period.

[step SA10] The master axis distribution movement amount and the slave axis distribution movement amount at the current period are output.

While the embodiment of the invention has been described, the invention is not limited to the example of the above-described embodiment and can be appropriately modified into various forms.

The invention claimed is:

1. A synchronization controller configured to start to move a slave axis when a master axis passes a certain position and then move by a predetermined distance while the master axis moves from the position by a predetermined distance, the synchronization controller comprising:
a synchronization operation instruction unit configured to set:
a master axis movement amount,
a slave axis movement amount, and
a position of the master axis at which the slave axis starts to be synchronized at a synchronization ratio set based on the slave axis movement amount and the master axis movement amount;
a synchronization magnification changing instruction unit configured to set the slave axis movement amount immediately before the synchronization from the start of changing of a speed ratio of the slave axis for synchronization with the master axis with a preset synchronization ratio to the end of changing of the speed ratio;
a synchronization parameter calculation unit configured to calculate a synchronization magnification at a time when changing of the synchronization magnification is completed, a master axis movement amount at a time when the synchronization magnification is changed, from the start of changing of a speed ratio of the slave axis for synchronization with the master axis with a preset synchronization ratio to the end of changing of the speed ratio, and a master axis movement amount from the current position of the master axis to a start of changing of the synchronization magnification, based on the slave axis movement amount, the master axis movement amount, and a position of the master axis at which the slave axis starts to be synchronized, which are set by the synchronization operation instruction unit, as well as the slave axis movement amount set by the synchronization magnification changing instruction unit;
a position calculation unit configured to calculate an inclination of the synchronization magnification which is graphically expressed as a linear function with respect to the position of the master axis and a position of the master axis at which the slave axis in a stop state starts to be operated, based on a calculation result of the synchronization parameter calculation unit to attain the synchronization magnification at a time when changing of the synchronization magnification is completed, calculated by the synchronization parameter calculation unit, at a time point when the slave axis completes moving by the movement amount set by the synchronization magnification changing instruction unit, or at the position of the master axis at which the slave axis starts to be synchronized set by the synchronization operation instruction unit; and
a slave axis movement amount output unit configured to output an instruction to the slave axis by gradually changing, from a position of the master axis at which a synchronization magnification changing operation is started, the inclination of the synchronization magnification with respect to a master axis speed.

2. A synchronization controller configured to start to move a slave axis when a master axis passes a certain position and then move by a predetermined distance while the master moves from the position by a predetermined distance, the synchronization controller comprising:
a synchronization operation instruction unit configured set:
a master axis movement amount,
a slave axis movement amount, and
a position of the master axis at which the slave axis starts to be synchronized at a synchronization ratio set based on the slave axis movement amount and the master axis movement amount;

a synchronization magnification changing instruction unit configured to set the slave axis movement amount immediately before the synchronization from the start of changing of a speed ration of the slave axis for synchronization with the master axis with a preset synchronization ratio to the end of changing of the speed ratio;

a synchronization parameter calculation unit configured to calculate a synchronization magnification at a time when changing of the synchronization magnification is completed, a master axis movement amount at a time when the synchronization magnification is changed, from the start of changing of a speed ratio of the slave axis for synchronization with the master axis with a preset synchronization ratio to the end of changing of the speed ratio, and a master axis movement amount from the current position of the master axis to a start of changing of the synchronization magnification, based on the slave axis movement amount, the master axis movement amount, and the position of the master axis at which the slave axis starts to be synchronized, which are set by the synchronization operation instruction unit, as well as the slave axis movement amount set by the synchronization magnification changing instruction unit;

a position calculation unit configured to calculate a position of the master axis at which the slave axis in a stop state starts to be operated in response to a set synchronization magnification change pattern, based on a calculation result of the synchronization parameter calculation unit to attain the synchronization magnification at a time when changing of the synchronization magnification is completed, calculated by the synchronization parameter calculation unit, at a time point when the slave axis completes moving by the movement amount set by the synchronization magnification changing instruction unit, or at the position of the master axis at which the slave axis starts to be synchronized set by the synchronization operation instruction unit; and a slave axis movement amount output unit configured to output, from a position of the master axis at which a synchronization magnification changing operation is started, an instruction to the slave axis while changing the synchronization magnification in response to a position of the master axis in accordance with the set synchronization magnification change pattern.

* * * * *